United States Patent
Onozawa (10) Patent No.: US 8,233,001 B2
(45) Date of Patent: Jul. 31, 2012

(54) DISPLAY APPARATUS, INFORMATION PROCESSING APPARATUS CAPABLE OF COMMUNICATING WITH DISPLAY APPARATUS, AND METHODS OF CONTROLLING SAME

(75) Inventor: Katsuyuki Onozawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 956 days.

(21) Appl. No.: 12/059,657

(22) Filed: Mar. 31, 2008

(65) Prior Publication Data

US 2008/0250161 A1 Oct. 9, 2008

(30) Foreign Application Priority Data

Apr. 3, 2007 (JP) ................................. 2007-097635

(51) Int. Cl.
*G06T 1/00* (2006.01)
*G06F 3/00* (2006.01)
(52) U.S. Cl. .......................................... 345/522; 710/5
(58) Field of Classification Search .................. 345/520, 345/522; 710/5
See application file for complete search history.

(56) References Cited

U.S. PATENT DOCUMENTS

| | | | | |
|---|---|---|---|---|
| 6,466,233 B1* | 10/2002 | Mitani | ........................... | 715/716 |
| 6,771,269 B1* | 8/2004 | Radecki et al. | ............... | 345/503 |
| 2004/0017367 A1* | 1/2004 | Kim | .............................. | 345/214 |
| 2004/0141083 A1* | 7/2004 | Takashima | ............... | 348/333.01 |
| 2007/0038939 A1* | 2/2007 | Challen et al. | ................ | 715/734 |

FOREIGN PATENT DOCUMENTS

| | | |
|---|---|---|
| JP | 10-027165 A | 1/1998 |
| JP | 2001-022681 A | 1/2001 |
| JP | 2003-029940 | 1/2003 |
| JP | 2006-261955 | 9/2006 |

OTHER PUBLICATIONS

The above reference was cited in a Jul. 30, 2010 Japanese Office Action, that issued in Japanese Patent Application No. 2007-097635.
The above reference was cited in a Apr. 24, 2009 Japanese Office Action that issued in Japanese Patent Application No. 2007-097635.

* cited by examiner

*Primary Examiner* — Xiao M. Wu
*Assistant Examiner* — Yingchun He
(74) *Attorney, Agent, or Firm* — Cowan, Liebowitz & Latman, P.C.

(57) ABSTRACT

A peripheral device acquires the processing load of a display apparatus to which the peripheral device is connected via an interface. In accordance with the processing load acquired, the peripheral device generates a data command for adjusting the load of processing for rendering display data. The display apparatus alters the display data based upon the data command, renders the display data after the alteration thereof and displays the rendered data. As a result, when the peripheral device instructs the display apparatus to subject the display data to rendering process, an increase in length of time it takes to obtain the result of rendering is reduced.

14 Claims, 7 Drawing Sheets

DISPLAY APPARATUS, INFORMATION PROCESSING APPARATUS CAPABLE OF COMMUNICATING WITH DISPLAY APPARATUS, AND METHODS OF CONTROLLING SAME

BACKGROUND OF THE INVENTION

1. Field of the Invention

The present invention relates to a display apparatus, an information processing apparatus capable of communicating with the display apparatus, and methods of controlling the display apparatus and information processing apparatus.

2. Description of the Related Art

A display apparatus typified by a digital television has a variety of external interfaces and is capable of data communication with various peripheral devices. Typical examples of such peripheral devices are digital cameras, video cameras, printers and remote controllers.

There is a display apparatus which, in order to display a GUI such as settings menu or electronic program guide, is equipped with a function for parsing markup language (HTML, XML, BML, SVG, etc.) and rendering text, graphics and images. To achieve this, a peripheral device capable of communicating with the display apparatus supplies the display apparatus with GUI data described in markup language, and the display apparatus renders the GUI data to present a display on its screen. Before this technique was available, a GUI generated by a peripheral device was rendered by the device, the rendered GUI data was supplied to a display apparatus as an image signal and displayed by the display apparatus. In other words, the display apparatus merely displayed an image signal and did not execute processing such as the rendering of GUI data.

However, since it has become possible for a display apparatus to render GUI data, it is now possible to present a display that is based upon the image quality, size and aspect ratio, etc., of the display apparatus. For example, by connecting a digital camera to the display apparatus as a peripheral device, supplying display data for rendering the GUI of the digital camera to the display apparatus and causing the apparatus to render this display data, it is possible for a user to perform camera settings, etc., while viewing GUI, which is based on optimized GUI data, displayed on the display apparatus.

However, processing for rendering markup language supplied from a peripheral device increases the processing load on the display apparatus. Consequently, if the display apparatus is under a heavy processing load owing to other processing, it can take time to obtain the result of rendering process of the markup language provided by the peripheral device. For example, if, in a case where the menu screen of a digital camera is displayed on the display apparatus and a menu operation is performed, it takes a prolonged period of time to obtain the result of rendering the menu screen, response to the menu-screen operation declines and operability suffers.

A known method of alleviating the processing load on a certain device in a system to which a plurality of devices are connected is to have some of the processing of the device under the heavy processing load be executed by another device whose processing load is light, as described in the specification of Japanese Patent Laid-Open No. 2003-029940, by way of example.

However, the peripheral device of a display apparatus often has a processing capability inferior to that of the display apparatus, and there are cases where the device is battery-driven, as in the case of a digital camera or remote controller. Accordingly, utilizing the device as one that executes some of the processing of the display apparatus is not advisable.

A further known method of alleviating processing load is to reduce the amount of processing or lower the complexity of processing if the processing load is heavy, as described in the specification of Japanese Patent Laid-Open No. 2006-261955, by way of example. In a case where the display apparatus executes such processing, however, if the processing load is heavy, the result of rendering process may be different from that expected on the side of the peripheral device. For example, the processing for rendering markup language may become too simplistic.

SUMMARY OF THE INVENTION

The present invention has been devised in view of these problems encountered in the prior art. In accordance with one aspect of the present invention, an increase in the time it takes to obtain the result of rendering process is reduced when a peripheral device instructs a display apparatus to execute processing for rendering display data.

According to an aspect of the present invention, there is provided an information processing apparatus comprising: a communication interface; acquisition unit adapted to acquire processing load of a display apparatus connected via the communication interface; rendering command generating unit adapted to generate a rendering command that specifies execution of rendering process of display data for displaying a screen on the display apparatus; data command generating unit adapted to generate a data command for adjusting the rendering process of the display data in the display apparatus in accordance with the processing load acquired; and transmitting unit adapted to transmit the rendering command and the data command to the display apparatus.

According to another aspect of the present invention, there is provided a display apparatus comprising: storage unit adapted to store display data for displaying a screen; a communication interface; rendering unit adapted to apply a render process to the display data and display the rendered display data in accordance with an instruction from an information processing apparatus connected to the communication interface; determination unit adapted to determine processing load of the display apparatus; and notification unit adapted to notify the information processing apparatus of the processing load; wherein the instruction from the information processing apparatus includes a data command for specifying an element, which is included in the display data, to which the rendering process is to be applied, and the rendering unit alters the display data based upon the data command and applies the rendering process of the display data after the alteration thereof.

According to further aspect of the present invention, there is provided a method of controlling an information processing apparatus which has a communication interface and is capable of communicating with a display apparatus connected via the communication interface, the method comprising: an acquisition step of acquiring processing load of the display apparatus; a rendering command generating step of generating a rendering command that specifies execution of rendering process of display data for displaying a screen on the display apparatus; a data command generating step of generating a data command for adjusting the rendering process of the display data in the display apparatus in accordance with the processing load acquired; and a transmitting step of transmitting the rendering command and the data command to the display apparatus using a transmitting unit.

According to yet further aspect of the present invention, there is provided a method of controlling a display apparatus having a storage unit holding display data for displaying a screen, and a communication interface, the method comprising: a rendering step of applying a rendering process to the display data and displaying the rendered display data in accordance with an instruction from an information processing apparatus connected to the communication interface; a determination step of determining processing load of the display apparatus; and a notification step of notifying the information processing apparatus of the processing load; wherein the instruction from the information processing apparatus includes a data command for specifying an element, which is included in the display data, to which the rendering process is to be applied, and the rendering step alters the display data based upon the data command and executes rendering process of the display data after the alteration thereof.

Further features of the present invention will become apparent from the following description of exemplary embodiments with reference to the attached drawings.

DESCRIPTION OF THE EMBODIMENTS

Preferred and exemplary embodiments of the present invention will now be described in detail in accordance with the accompanying drawings.

(First Embodiment)

Figure 1:
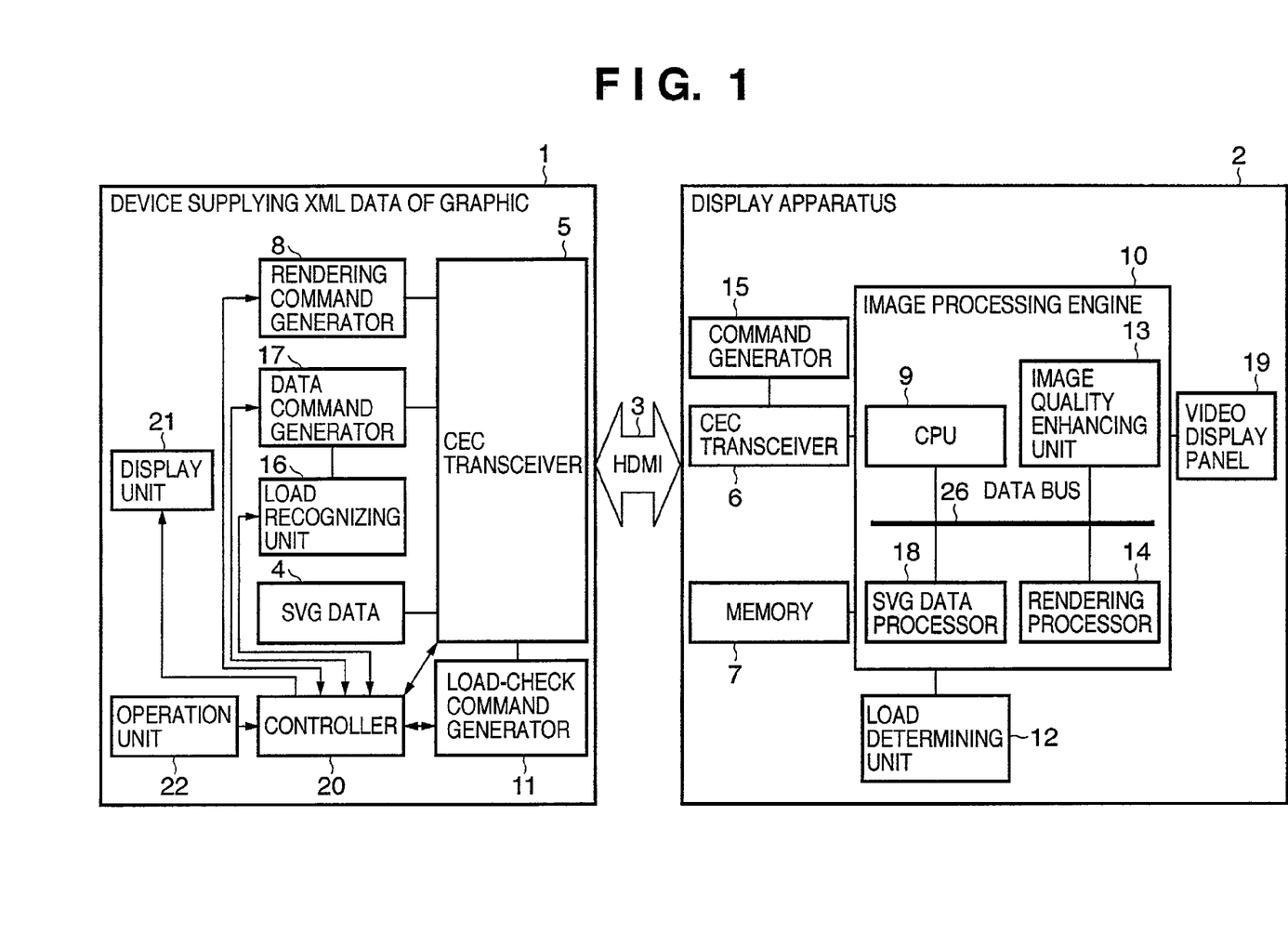
FIG. 1 is a block diagram illustrating an example of the configuration of a display system according to a first embodiment of the present invention.

FIG. 1 is a block diagram illustrating an example of the configuration of a display system according to a first embodiment of the present invention. The system according to this embodiment includes a display apparatus 2 and a peripheral device 1 connected to the display apparatus 2 so as to be capable of communicating with the display apparatus 2. The display apparatus 2 is a digital television receiver, and the peripheral device 1 is an information processing unit such as a digital camera, video camera, printer or remote controller, as mentioned earlier.

In this embodiment, the display apparatus 2 has a function for parsing and rendering markup language. The peripheral device 1 supplies the display apparatus 2 with display data described in SVG (Scalable Vector Graphics), which is one example of markup language. Further, SVG is language that describes vector graphics using XML (Extensible Markup Language) and has been standardized by the W3C (World-Wide Web Consortium).

It should be noted that the peripheral device 1 may be any device so long as it is capable of supplying the display apparatus 2 with display data described in markup language that can be parsed by the display apparatus 2 and is capable of acquiring the processing load of the display apparatus 2. In this embodiment, it is assumed that the peripheral device 1 is a digital camera having such functions.

Further, the peripheral device 1, which is a device for supplying display data, and the display apparatus 2, which executes processing for rendering display data that has been received, are connected by a communication interface. It is assumed that the communication interface is an HDMI (High-Definition Multimedia Interface) 3. Held within the peripheral device 1 in a non-volatile storage device such as a ROM is SVG-format display data (SVG data) representing text, graphics and images, etc. This data is used when displaying the GUI of an operating screen or menu screen, etc.

The peripheral device 1 is connected to the display apparatus 2 through the HDMI 3. When a state in which communication is possible is attained, the peripheral device 1 transfers at least some of the SVG data 4 to the display apparatus 2 beforehand. The transfer of the SVG data 4 is performed by CEC (Consumer Electronics Control) transceivers 5 and 6 through a CEC signal line included in the HDMI 3 and capable of performing bidirectional data communication. The display apparatus 2 stores the SVG data 4, which has been received by the CEC transceiver 6, in a memory 7 temporarily.

It should be noted that the transfer of the SVG data 4 may be performed by a TMDS (Transition Minimized Differential Signaling) signal line of the HDMI 3. In this case also it is possible to obtain effects similar to those obtained when transfer is performed using the CEC signal line.

An operation unit 22 in the peripheral device 1 is an input device that includes keys and buttons, etc., for accepting various instructions from the user. If some operation such as an operation for displaying a menu is performed through the operation unit 22, a controller 20 senses this operation and applies the content of the operation to a rendering command generator 8.

The rendering command generator 8 generates a rendering command in the SVG format. The rendering command is for generating a GUI screen, such as a menu screen, which conforms to the content of the operation performed. The rendering command causes the controller to perform rendering and causes a menu screen, etc., to be displayed on a display unit 21. In this embodiment, the GUI screen displayed on the peripheral device 1 and the GUI screen displayed on the display apparatus 2 are based upon the same SVG data and, hence, are basically identical.

However, in a case where the GUI of the peripheral device 1 is displayed on the display apparatus 2, it is preferred that the GUI display on the display unit 21 of the peripheral device 1 be turned off in order to avoid user confusion and reduce needless consumption of power.

The controller 20 determines whether an operation performed by the user is one that requires rendering of that part of the SVG data 4 that has already been transferred to the display apparatus 2. If the controller 20 determines that rendering of the SVG data 4 by the display apparatus 2 is required, then a command for checking the processing load of an image processing engine 10 of the display apparatus 2 is generated by a command generator 11. The command for checking the processing load is transmitted to the display apparatus 2 through the CEC transceiver 5.

The display apparatus 2 receives the command for checking the processing load and determines the processing load of the image processing engine 10 using a load determining unit 12. The processing load of the image processing engine 10 includes the loads of units within the image processing engine 10, namely the loads of a CPU 9, an image quality enhancing unit 13 for enhancing the image quality of received broadcast waves, and a rendering processor 14 for rendering SVG-format data. The result of determination by the load determining unit 12 is converted to a command by a command generator 15 in the display apparatus 2 and is transmitted via the CEC transceiver 6 to the peripheral device 1 as information representing the processing load.

There is no particular limitation upon the method of determining processing load used by the load determining unit 12 that determines the processing load of the display apparatus 2 or, more specifically, the processing load of the image processing engine 10. For example, the load can be determined based upon the degree of contention for a data bus 26. Further, if the arrangement is one in which the image quality enhancing unit 13, rendering processor 14 and SVG data processor 18 are actually implemented by the CPU 9 in the form of software, the processing load of the CPU 9 can be used as the processing load of the image processing engine 10. The processing load of the CPU may be the rate of CPU use, which is capable of being found by a well-known technique.

The peripheral device 1 recognizes the extent of processing load using a load recognizing unit 16 based upon the received information indicative of processing load. A data command for adjusting rendering process that is based upon a rendering command in accordance with the recognized processing load is generated by a data command generator 17. The rendering command generated by the rendering command generator 8 in accordance with the operation performed at the peripheral device 1 and the data command generated by the data command generator 17 in accordance with the processing load of the display apparatus 2 are transmitted to the display apparatus 2 through the CEC transceiver 5.

Figure 2:
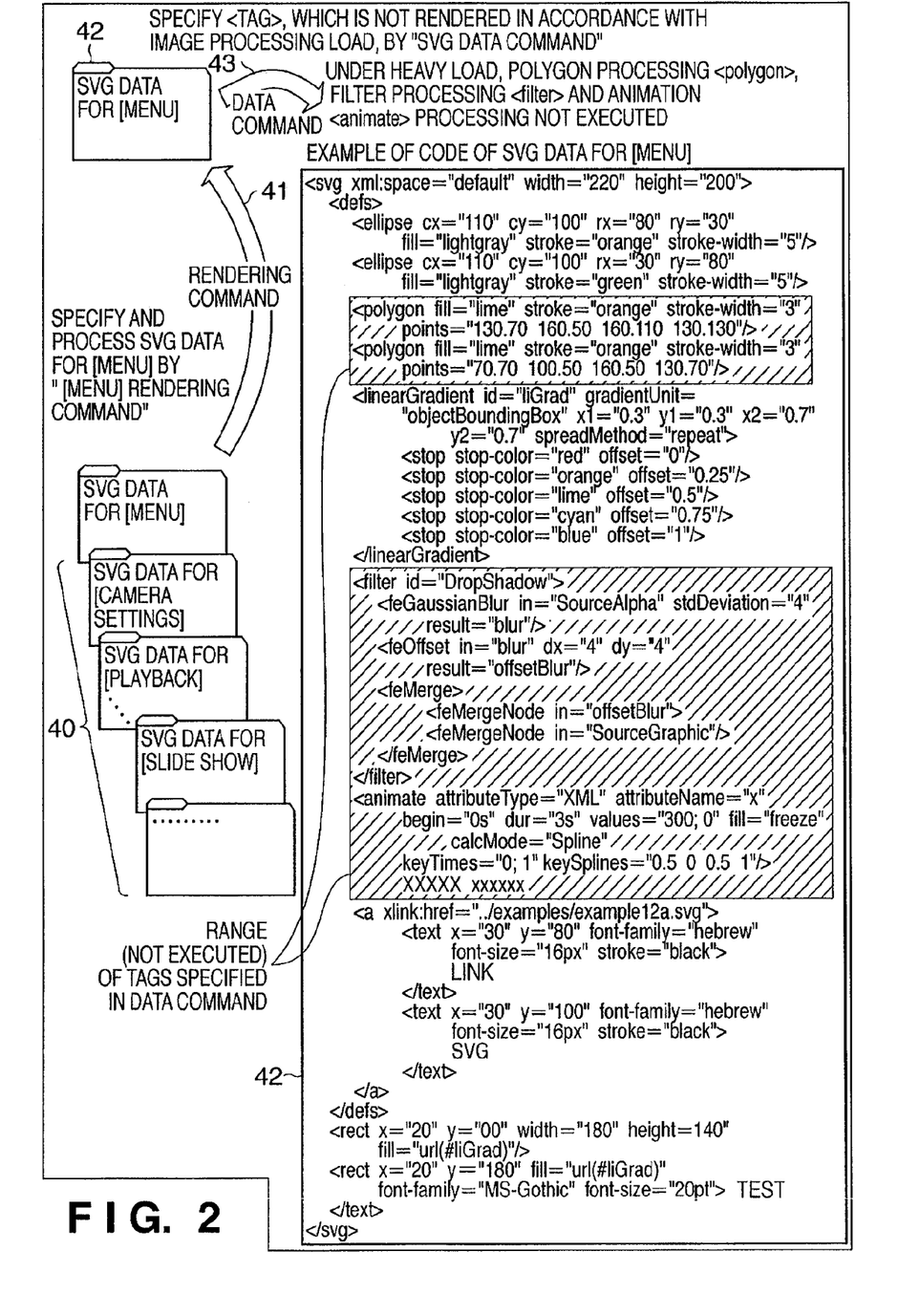
FIG. 2 is a diagram useful in describing an example of a rendering commands and data command generated by a peripheral device according to the first embodiment.

FIG. 2 is a diagram useful in describing an example of a rendering command and a data command generated by the peripheral device 1 according to this embodiment.

It is assumed that SVG data transferred when the peripheral device 1 has been connected to the display apparatus 2 has been described using a full set of SVG. As illustrated in FIG. 2, the transmit processor 40 includes a plurality of items of SVG data conforming to a menu operation performed at the peripheral device 1, examples of the SVG data being SVG data for displaying a "MENU SCREEN" and SVG data for displaying a "CAMERA SETTINGS SCREEN".

Accordingly, in a case where a "MENU SCREEN" display instruction has been applied from the operation unit 22 in the peripheral device 1, the rendering command generator 8 generates a rendering command 41 for specifying SVG data 42, which is for displaying the "MENU SCREEN".

On the other hand, as described above, in a case where the generated rendering command is a command for specifying SVG-data rendering process in the display apparatus 2, the peripheral device 1 acquires the processing load of the display apparatus 2 using the load checking command. As to whether or not the generated rendering command is accompanied by rendering of SVG data in the display apparatus 2, the content of already transferred SVG data can be stored and the determination can be made depending upon whether the SVG data specified by the rendering command specifies the already transferred SVG data.

The data command generator 17 generates a data command based upon information representing the processing load, this information being transmitted from the display apparatus 2 in response to the load checking command. The data command is a command that specifies the portion of rendering content, which is included in the SVG data, that does not require rendering process (this portion is composed of render elements). The data command is for adjusting rendering content in accordance with processing load.

Elements not requiring rendering process, or more specifically, elements of the SVG data that do not undergo rendering, can be determined in advance in accordance with the extent of the processing load and are not particularly limited. Preferably, however, a portion not requiring processing should be decided in a direction that simplifies the display method and does not reduce the items displayed.

More specifically, render elements for providing visual effects, e.g., render elements for displaying an animation, render elements for presenting a three-dimensional display and render elements for alpha blending, can be adopted as unnecessary elements. In this embodiment, the designation of an element not requiring rendering process is made by specifying a tag based upon the composition of the SVG data.

In the example shown in FIG. 2, the data command generator 17 generates a data command that specifies polygon processing, filter processing and animation processing as elements not requiring rendering in a case where it has been determined that the load on the display apparatus 2 is heavy. In the data command, therefore, <polygon>, <filter> and <animate>", which are tags corresponding to elements not requiring rendering, are specified.

On the basis of the rendering command received, the SVG data processor 18 of the display apparatus 2 selects data (here SVG data for displaying the menu screen) corresponding to operation and display from among the SVG data stored temporarily in the memory 7. The SVG data processor 18 then alters this data to SVG data conforming to the processing load by removing the portion corresponding to the tag specified in the data command from the selected SVG data. The SVG data processor 18 applies the altered SVG data to the rendering processor 14.

The rendering processor 14 subjects the altered SVG data from the SVG data processor 18 to rendering process and displays the processed data on a video display panel 19 of the display apparatus 2.

Thus, in accordance with the processing load of the display apparatus 2, the peripheral device 1 supplies the display apparatus 2 with a data command for altering the SVG data that is to be processed by the display apparatus 2. The display apparatus 2 applies rendering process to the SVG data altered in accordance with the data command.

More specifically, by issuing a data command according to which it will suffice if the display apparatus 2 executes simple rendering process in a state in which the processing load is heavy owing to processing such as image quality enhancing processing, display of results of rendering can be realized rapidly even if the display apparatus 2 is under a heavy processing load.

Furthermore, by generating the data command in the peripheral device 1 in accordance with the processing load of the display apparatus 2, a change in display content not intended by the peripheral device 1 can be prevented from taking place in the display apparatus 2.

If it is so arranged that content of rendering is adjusted independently based upon a decision rendered by the display apparatus 2 itself in a case where processing for rendering SVG data in the display apparatus 2 is adjusted in accordance with the load, it will be possible to reduce the rendering load in the display apparatus 2. However, if the display apparatus 2 changes the rendering of a tag on its own, what kind of rendering process the display apparatus 2 is executing will be unknown on the side of the peripheral device 1 actually operated by the user. As a result, a discrepancy develops between the rendering content that the peripheral device 1 assumes and the rendering content that the display apparatus 2 renders. Ultimately this discrepancy is conveyed to the user as a difference in appearance between the screen display presented on the display apparatus 2 and the screen display presented on the peripheral device 1 or as a discrepancy in mode of operation.

Figure 3A:
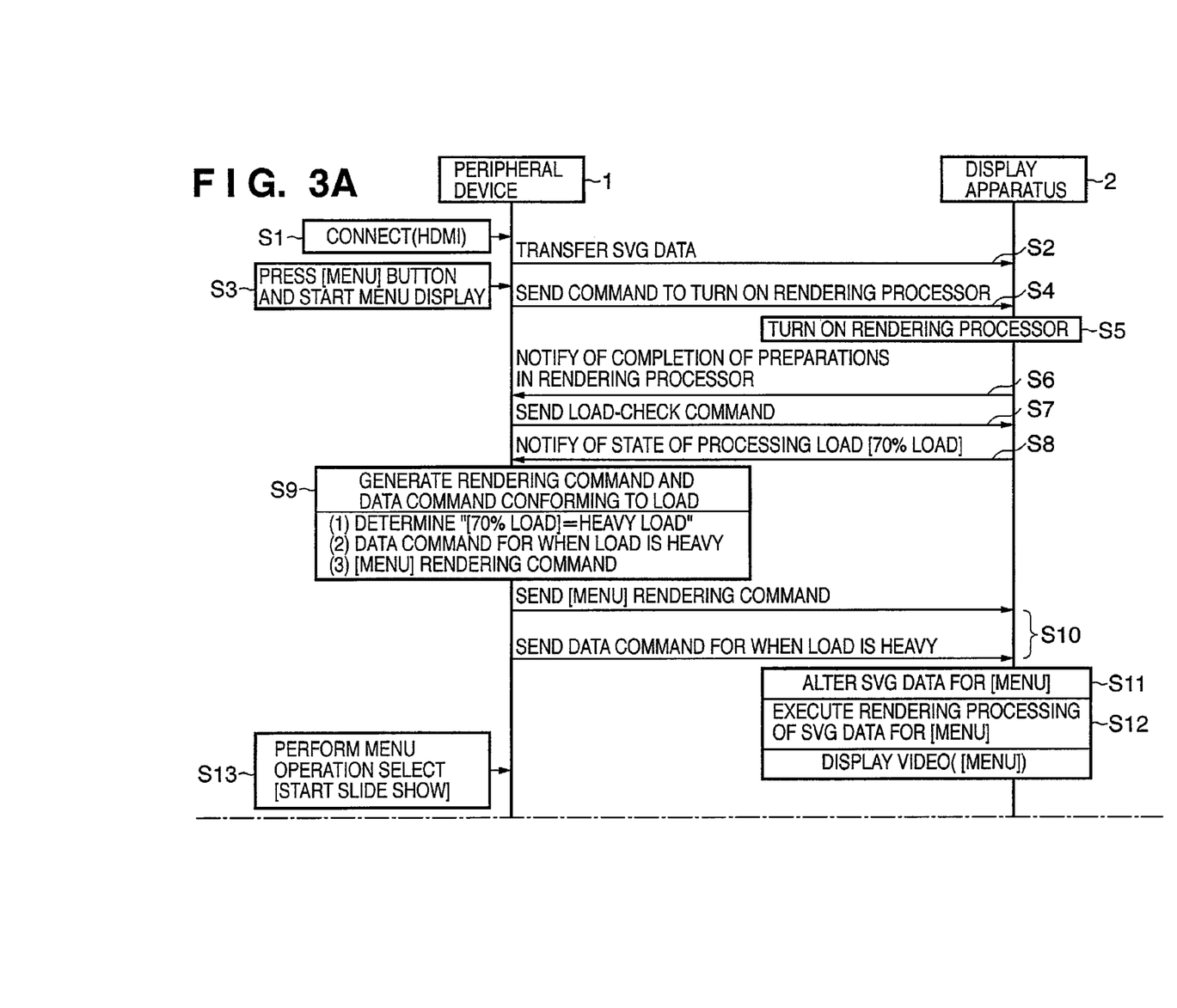
FIGS. 3A and 3B are exemplary sequence charts useful in describing operation in the display system according to the first embodiment.
Figure 3B:
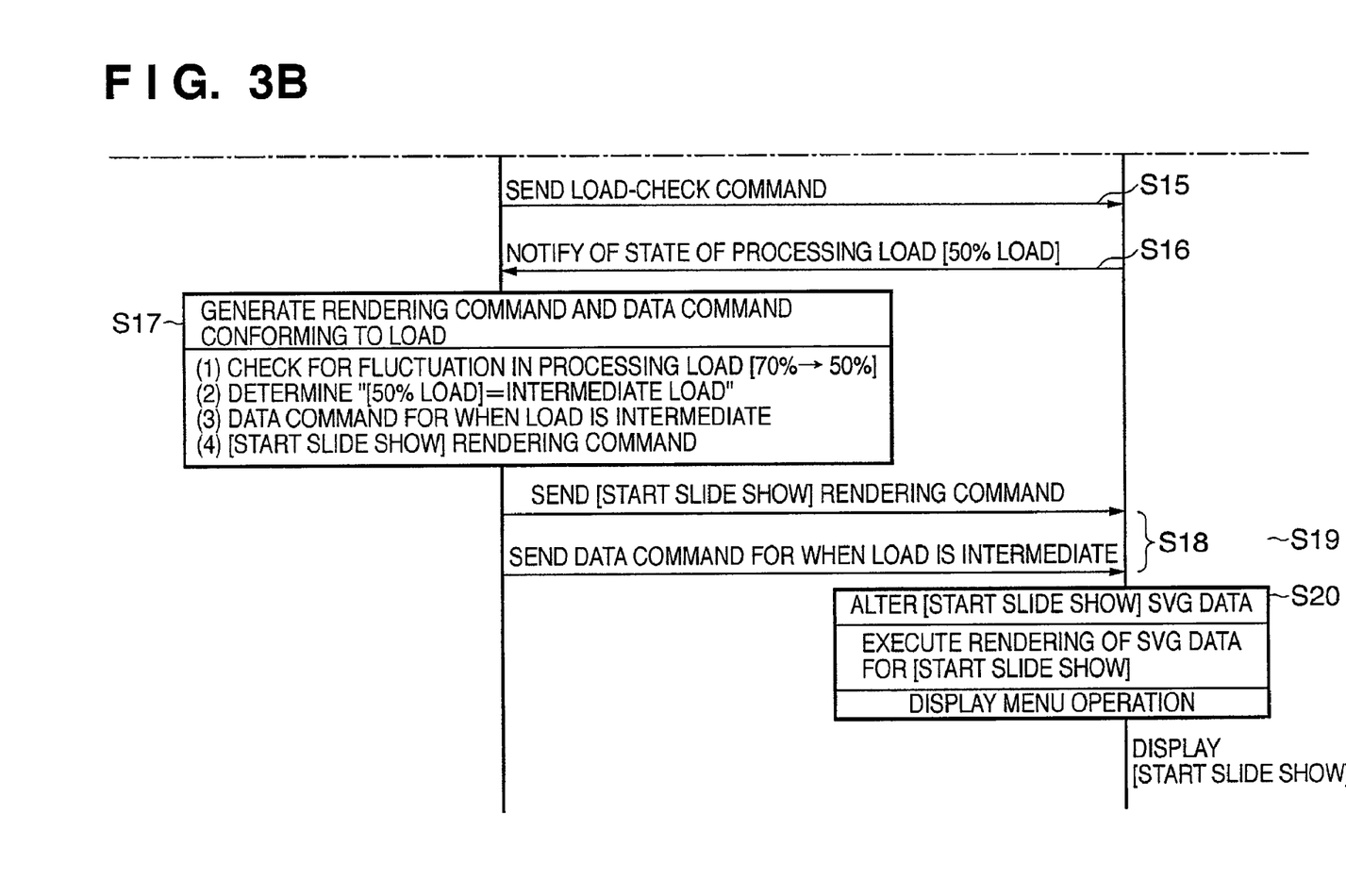

FIGS. 3A and 3B are exemplary sequence charts for explaining how the above-described control operation is performed in the display system according to the first embodiment.

When the peripheral device 1 is connected to the display apparatus 2 by the HDMI 3 (S1), at least some of the SVG data representing graphics or text supplied by the peripheral device 1 is transferred to the display apparatus 2 (S2).

An instruction to present a menu display is issued as in response to depression of a menu button included in, e.g., the operation unit 22 of the peripheral device 1 (S3). In response to the instruction, the controller 20 generates a command for turning on the rendering processor 14 and transmits the command to the display apparatus 2 through the CEC transceiver 5 (S4).

Upon receiving the command, the display apparatus 2 turns on the rendering processor 14 (S5) and, through the CEC transceiver 6, notifies the peripheral device 1 of the fact that rendering process by the rendering processor 14 has become possible (S6).

Next, using the command generator 11, the controller 20 generates the command for checking the processing load of the display apparatus 2 and transmits this command to the display apparatus 2 (S7).

Upon receiving the load checking command, the display apparatus 2 determines the processing load using the load determining unit 12. The peripheral device 1 is notified of the result of the determination through the CEC transceiver 6 (S8). Here it is assumed that the rate of use of the display apparatus 2 (image processing engine 10) is 70%.

By using the rendering command generator 8, the peripheral device 1 so notified of the processing load generates a rendering command conforming to the operation performed by the user. Here the peripheral device 1 generates a rendering command specifying SVG data for the menu display. With respect to the SVG data specified by the rendering command, the peripheral device 1 further generates a data command for specifying a change conforming to the processing load using the data command generator 17 (S9). In view of notification that the rate of use is 70%, the peripheral device 1 determines that the display apparatus 2 is under a heavy load and generates a data command that corresponds to the heavy load. The peripheral device 1 transmits these two commands to the display apparatus 2 through the CEC transceiver 5 (S10).

Upon receiving the rendering command and the data command, the display apparatus 2 uses the SVG data processor 18 to alter the SVG data specified by the rendering command to content specified by the data command (S11).

The rendering processor 14 renders the SVG data that has been altered and displays the result on the video display panel 19 (S12).

By thus altering the data to SVG-format data conforming to the processing load, the time it takes to obtain the results of rendering the SVG data can be kept short even in circumstances where the load on the display apparatus 2 is heavy. Further, by making the change in the XML data not based upon a decision rendered by the display apparatus 2 on its own but by the data command generated by the peripheral device 1, alteration of the SVG data that will affect the content of operation or display can be prevented and it is possible to cause the display apparatus to render display data in the form of a display intended by the peripheral device 1.

Thereafter, when a further menu operation is performed at the peripheral device 1 (S13), similar processing is executed (S15 to S20 in FIG. 3B). For example, in a case where there has been a change in the processing load of which notification has been given in response to the load-check command, a data command conforming to this change is generated and transmitted (S17, S18).

In the example of FIGS. 3A and 3B, load is heavy in the case of an instruction to display the menu screen. Then, in response to a load-check command prevailing when an instruction to start a slide show is issued, the load changes to an intermediate load. At S17, therefore, a data command corresponding to the intermediate load is generated.

The data command corresponding to the intermediate load is then transmitted together with the rendering command for starting the slide show (S18), and the display apparatus 2 executes processing for altering the SVG data and the rendering process corresponding to these commands (S19, S20).

Thus, in a case where processing for rendering SVG data is necessary in the display apparatus 2, a query is made regarding the processing load of the display apparatus 2 and therefore a data command suited to a fluctuation in processing load in the display apparatus 2 can be generated. As a result, a display in line with the intention of the peripheral device 1 can be presented on the display apparatus 2 while the response of the display on the display apparatus 2 to operation at the peripheral device 1 is suitably maintained.

In the first embodiment, content specified by a data command is written in the form of a command specifying an element, which does not require rendering process, included in SVG data. According to the present invention, however, it is possible to obtain similar effects even with a command that specifies an element requiring rendering process. That is, in a case where the display apparatus 2 renders SVG data, the data command is a command for specifying an element to which rendering process is to be applied. Further, the fact that the data command is a command for specifying an element to be rendered holds also in other embodiments, described later.

(Second Embodiment)

Figure 4:
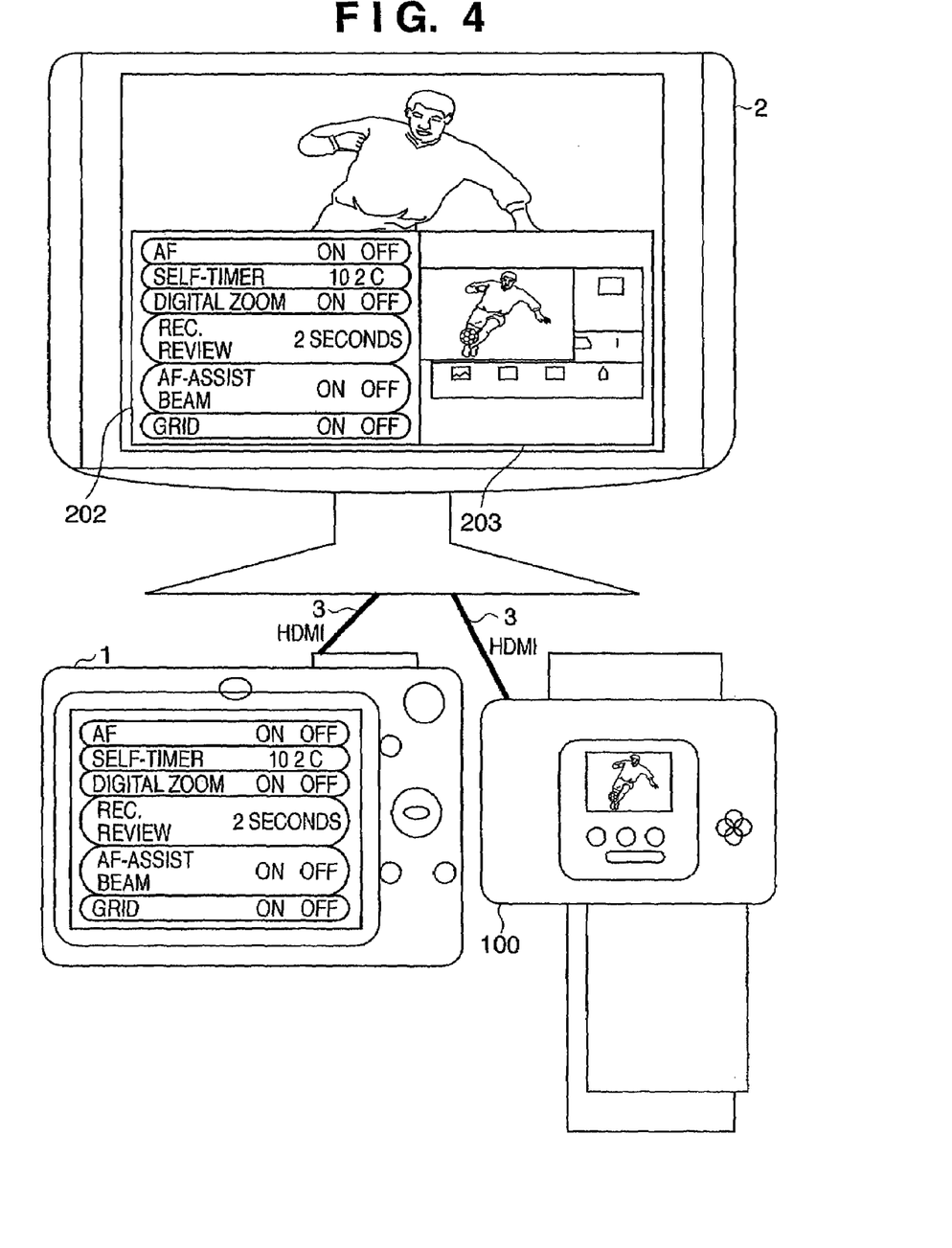
FIG. 4 is a diagram schematically illustrating an example of the configuration of a display system according to a second embodiment of the present invention.

FIG. 4 is a diagram schematically illustrating an example of the configuration of a display system according to a second embodiment of the present invention.

The display system according to this embodiment differs from the display system of the first embodiment in that a plurality of peripheral devices are connected to the display apparatus. In this embodiment, it is assumed that the first peripheral device 1 is a digital camera and that a second peripheral device 100 is a printer. It should be noted that the second peripheral device 100, besides being configured to achieve the function of a printer, also has the components possessed by the peripheral device 1 in FIG. 1.

Figure 5A:
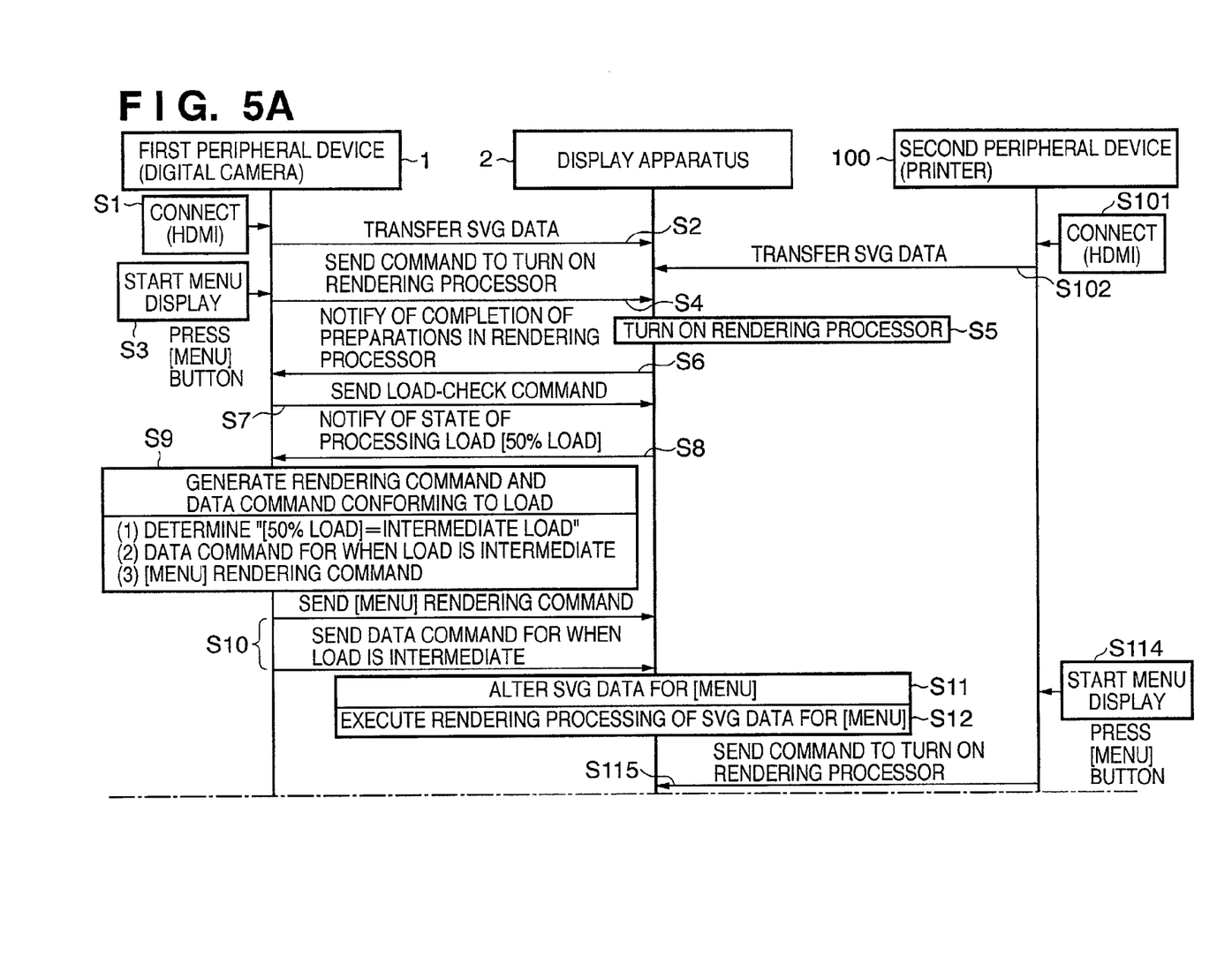
FIGS. 5A and 5B are exemplary sequence charts useful in describing operation in the display system according to a second embodiment of the present invention.
Figure 5B:
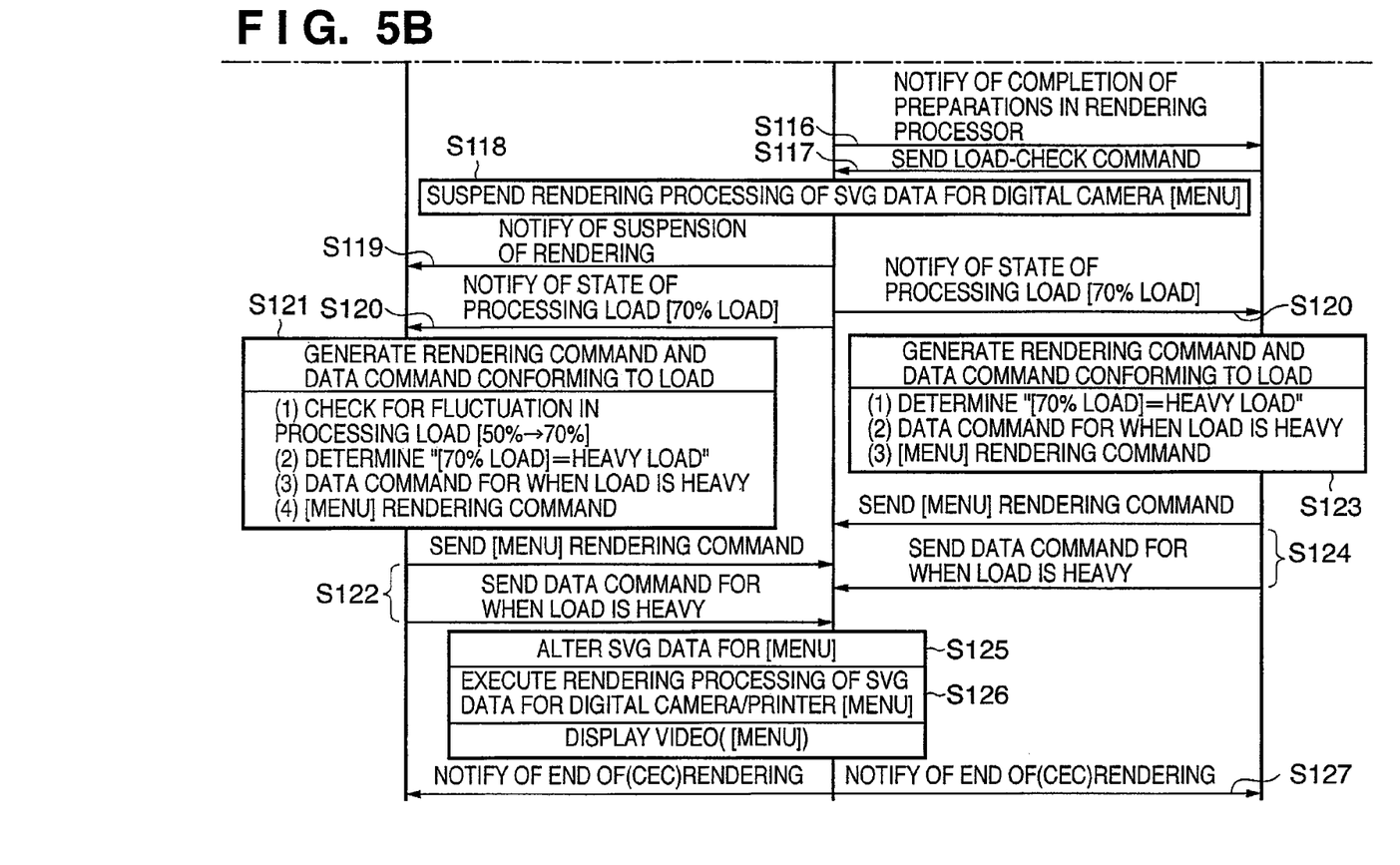

Reference will be had to the exemplary sequence charts shown in FIGS. 5A and 5B to describe the operation of the first and second peripheral devices 1 and 100, respectively, and the display apparatus 2 in the display system according to this embodiment. It should be noted that steps in FIG. 5A similar to those in FIG. 3A are designated by like step numbers and need not be described again.

Described will be operation in a case where the display apparatus 2 displays the menu screen of the first peripheral device 1 and the menu screen of the second peripheral device 100.

At S1 and S101, the first peripheral device 1 and second peripheral device 100 are respectively connected to the display apparatus 2 by the HDMI 3. The first peripheral device 1 and second peripheral device 100 transfer at least some of SVG data 4, which is possessed by each, to the display apparatus 2 (S2, S102). Here it will be assumed that all of the SVG data is transferred. The display apparatus 2 stores the received SVG data in the memory 7 temporarily.

Thereafter, in a manner similar to that of the first embodiment, the series of processing of S4 to S10 is executed when the first peripheral device 1 issues an instruction to display the menu screen. However, this embodiment differs from the first embodiment in that a determination that the load is an intermediate load is made based upon information (rate of use of 50%) representing the processing load sent back from the display apparatus 2 at S8, and in that a data command corresponding to the intermediate load is generated and transmitted (S9, S10).

The display apparatus 2 executes processing to alter the SVG data for displaying the menu screen of the first peripheral device 1 (S11) and, while execution of rendering process (S12) by the display apparatus 2 is in progress, the second peripheral device 100 issues an instruction to display the menu screen (S114).

In response, the second peripheral device 100 also transmits a command for turning on the rendering processor 14 (S115) in a manner similar to that of the first peripheral device 1. Since the display apparatus 2 has already received a command for turning on the rendering processor 14 at S4 and the rendering processor 14 is in a state which it is capable of executing rendering process, the display apparatus 2 immediately sends back notification of completion of preparations for rendering process (S116).

In response to being so notified, the second peripheral device 100 transmits the load-check command to the display apparatus 2 (S117).

Upon receiving this command, the display apparatus 2 suspends the in-progress rendering process of the SVG data from the first peripheral device 1 (S118). The display apparatus 2 notifies the first peripheral device 1 of suspension of rendering process by a command sent through the CEC transceiver 6 (S119).

The display apparatus 2 then uses the load determining unit 12 to determine a processing load that takes into account the processing load for rendering SVG data from the second peripheral device 100 and notifies the first peripheral device 1 and second peripheral device 100 of the result (S120). Thus, in a case where a plurality of peripheral devices have been connected, the display apparatus 2 according to this embodiment is such that when rendering process of SVG data from a certain peripheral device is executed, the rendering process of SVG data from another peripheral device that was in the process of being executed is suspended. The peripheral device for which rendering process has been suspended is then notified of such suspension. Furthermore, the display apparatus 2 reports the updated processing load to each peripheral device that has requested the rendering process of SVG data. As a result, each peripheral device is given an opportunity to generate a data command conforming to the updated processing load of the display apparatus 2.

Upon receiving notification of suspension of rendering process and the updated processing load of the display apparatus 2, the first peripheral device 1 executes processing similar to that of S9 again. That is, the first peripheral device 1 generates a rendering command that specifies SVG data conforming to the operation, which here is SVG data for displaying a menu, and a data command conforming to the received (updated) processing load (S121). More specifically, by adding on the processing load for executing rendering process of SVG data in accordance with a request from the second peripheral device 100, the processing load of the display apparatus 2 rises and therefore the first peripheral device 1 generates a data command in which elements not requiring processing are increased. These two commands are transmitted to the display apparatus 2 (S122).

On the other hand, the second peripheral device 100 also executes similar processing (S123). That is, the second peripheral device 100 generates a rendering command that specifies SVG data for displaying a menu and a data command conforming to the received processing load (S123). The second peripheral device 100 transmits these two commands to the display apparatus 2 (S124).

Upon receiving the rendering commands and data commands from the first peripheral device 1 and second peripheral device 100, the display apparatus 2 uses the SVG data processor 18 to alter the SVG data, which has been specified by the respective rendering commands, based upon the corresponding data commands (S125).

The rendering processor 14 then executes processing for rendering each of the menu screens (S126) and presents a video display. In FIG. 4, reference numerals 202 and 203 denote examples of display of the menu screens of the first and second peripheral devices, respectively.

Thus, in a case where the display apparatus 2 of this embodiment is in a state in which it renders data from a plurality of peripheral device, all of the relevant peripheral devices are notified of information concerning the processing load transmitted in response to a command for checking the processing load. Each peripheral device then generates a data command and rendering command conforming to the updated processing load.

As a result, even in a case where there is an increase in load the cause of which is another peripheral device, it is possible to suppress a slow-down in response of a display to a user operation.

It should be noted that a peripheral device that has been connected to a display apparatus is not limited solely to a digital camera and printer and may just as well be a device such as a video camera and remote controller, and that similar effects can be expected even if such devices are connected. Further, the interface connecting the display apparatus and peripheral device is not limited to a HDMI. Similar effects can be expected even in a case where the connection is based upon infrared communication or wireless communication or where devices are connected separately by control lines or data transmission lines.

(Other Embodiments)

In a case where the display apparatus 2 has a load alleviating function for altering the content of processing in accordance with its own processing load in the foregoing embodiments, it may be so arranged that the load alleviating function is deactivated in logical communication establishment processing executed when the peripheral device 1 is physically connected. As a result, it is possible to reliably prevent a situation in which a change in XML data not intended by the peripheral device 1 is made when the display apparatus 2 is subjected to a heavy processing load.

The foregoing embodiments are capable of being implemented in the form of software by the computer (or CPU or MPU, etc.) of a system of apparatus.

Accordingly, since the foregoing embodiments are implemented by computer, the computer program per se supplied to the computer also implements the present invention. In other words, a computer program per se for implementing the functions of the foregoing embodiments is one aspect of the present invention.

If the computer program for implementing the foregoing embodiments is readable by computer, it may be in any form. For example, although the computer program can be constituted by object code, a program executed by an interpreter or script data supplied to an operating system, etc., it is not limited to these.

The computer program for implementing the foregoing embodiments is supplied to the computer by a storage medium or wired/wireless communication. Examples of storage media for supplying the program are magnetic recording media such as flexible disk, hard disk and magnetic tape, optical/magneto-optical storage media such as a magneto-optical disk, CD and DVD, and a non-volatile semiconductor memory.

As for the method of supplying the computer program using wired/wireless communication, there is a method that utilizes a server on a computer network. In this case, a data file (program file) that can serve as a computer program for forming the present invention is stored in the server beforehand. The program file may be one in an execution format or it may be source code.

The program file is supplied by downloading it to a client computer that has accessed this server. In such case the program file can be divided into a plurality of segment files and the segment files can be dispersed and deployed at different servers.

In other words, a server apparatus that supplies a client computer with a program file for implementing the foregoing embodiments also is one aspect of the present invention.

Further, a storage medium on which the computer program for implementing the foregoing embodiments has been encrypted and stored may be distributed, users who meet certain requirements may be supplied with decryption key information, and these users may be permitted to install the program on their computers. The key information can be supplied by being downloaded from a website via the Internet, by way of example.

Further, the computer program for implementing the foregoing embodiments may utilize the functions of an operating system already running on the computer.

Furthermore, the computer program for implementing the foregoing embodiments may be constituted by firmware such as an expansion board installed in the computer, or it may be so arranged that the program is executed by a CPU provided on an expansion board.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-97635, filed on Apr. 3, 2007, which is hereby incorporated by reference herein in its entirety.

What is claimed is:

1. An information processing apparatus comprising:
a communication unit configured to communicate with a display apparatus, wherein the display apparatus generates a display screen by executing a rendering process of a display data and the display data includes a plurality of elements relating to the rendering process;
an acquisition unit configured to acquire load information relating to a load state of the display apparatus;
a generating unit configured to select an element that causes the rendering process to stop, from the plurality of elements, in accordance with the load information acquired by the acquisition unit and to generate a data command for discriminating the selected element,
wherein the generating unit selects a first predetermined element for a first state, if the load state of the display apparatus is the first state, and selects a second predetermined element for a second state in which the load of the display apparatus is heavier than the first state, if the load state of the display apparatus is the second state; and
a control unit configured to control the communication unit to output to the display apparatus a rendering command for instructing an execution of the rendering process of the display data and the data command generated by the generating unit, the control unit controlling the communication unit to output the data command such that the display apparatus is not to execute the rendering process of the selected element,
wherein if the load state of the display apparatus is the first state, the control unit controls the communication unit to output the data command to the display apparatus in order to prevent the display apparatus from executing the rendering process of the first predetermined element selected by the generating unit, and
wherein if the load state of the display apparatus is the second state, the control unit controls the communication unit to output the data command to the display apparatus in order to prevent the display apparatus from executing the rendering process of the second predetermined element selected by the generating unit.

2. The apparatus according to claim 1, wherein the communication unit outputs the display data to the display apparatus.

3. The apparatus according to claim 1, wherein the display data is data for a GUI display in said information processing apparatus.

4. The apparatus according to claim 1, further comprising an operating unit for accepting input of an instruction from a user;
wherein said acquisition unit acquires the processing load in response to input of an instruction via said operating unit.

5. A display apparatus comprising:
a communication unit configured to communicate with a plurality of information processing apparatuses including a first information processing apparatus and a second information processing apparatus;
a storage unit configured to store first display data acquired from the first information processing apparatus and second display data acquired from the second information processing apparatus;
a control unit configured to control the communication unit to output to the plurality of information processing apparatuses load information relating to a load state of a display apparatus in accordance with an acquisition request from at least one of the plurality of information processing apparatuses; and
a rendering unit configured to apply a rendering process to the display data stored in the storage unit and generate a display screen in accordance with an instruction from at least one of the plurality of information processing apparatuses,
wherein the rendering unit applies the rendering process to the first display data in accordance with the instruction from the first information processing apparatus and applies the rendering process to the second display data in accordance with the instruction from the second information processing apparatus, wherein the rendering unit does not apply the rendering process to an element, which the first information processing apparatus selects from a plurality of elements included in the first display data in accordance with the load information output by the communication unit, and does not apply the rendering process to an element which the second information processing apparatus selects from a plurality of elements included in the second display data in accordance with the load information output by the communication unit, wherein the control unit stops the rendering unit from applying the rendering process to the first display data and controls the communication unit to output the load information to both the first information processing apparatus and the second information processing apparatus if the communication unit receives the acquisition request from the second information processing apparatus during the rendering process of the first display data.

6. A method of controlling an information processing apparatus which has a communication interface and is capable of communicating with a display apparatus connected via the communication interface, said method comprising:

a communication step of communicating with the display apparatus, wherein the display apparatus generates a display screen by executing a rendering process of a display data and the display data includes a plurality of elements relating to the rendering process;

an acquisition step of acquiring load information relating to a load state of the display apparatus;

a generating step of selecting an element that causes the rendering process to stop, from the plurality of elements, in accordance with the load information acquired at the acquisition step and of generating a data command for discriminating the selected element, wherein, at the generating step, a first predetermined element is selected for a first state if the load state of the display apparatus is the first state, and a second predetermined element is selected for a second state in which the load of the display apparatus is heavier than the first state if the load state of the display apparatus is the second state; and a control step of controlling the communication step to output to the display apparatus a rendering command for instructing an execution of the rendering process of the display data and the data command generated at the generating step, the control step controlling the communication step to output the data command such that the display apparatus is not to execute the rendering process of the selected element;

wherein if the load state of the display apparatus is the first state, the controlling step controls the communication step to output the data command to the display apparatus in order to prevent the display apparatus from executing the rendering process of the first predetermined element selected by the generating unit, and wherein if the load state of the display apparatus is the second state, the controlling step controls the communication step to output the data command to the display apparatus in order to prevent the display apparatus from executing the rendering process of the second predetermined element selected by the generating unit.

7. The method according to claim 6, wherein the communication step outputs the display data to the display apparatus.

8. The method according to claim 6, wherein the display data is data for presenting a GUI display in the information processing apparatus.

9. The method according to claim 6, wherein the display apparatus has an operating unit for accepting input of an instruction from a user; and said acquisition step acquires the processing load in response to input of an instruction via the operating unit.

10. A method of controlling a display apparatus having a storage unit holding display data for displaying a screen, and a communication interface, said method comprising:

a communication step of communicating a with a plurality of information processing apparatuses including a first information processing apparatus and a second information processing apparatus;

a storing step of storing first display data acquired from the first information processing apparatus and second display data acquired from the second information processing apparatus;

a controlling step of controlling the communication step to output to the plurality of information apparatuses load information relating to a load state of a display apparatus in accordance with an acquisition request from at least one of the plurality of information apparatuses;

a rendering step of applying a rendering process to the display data stored at the storage step and generating a display screen in accordance with an instruction from at least one of the plurality of information processing apparatuses;

wherein, at the rendering step, the rendering process is applied to the first display data in accordance with the instruction from the first information processing apparatus and the rendering process is applied to the second display data in accordance with the instruction from the second information processing apparatus, wherein the rendering step does not apply the rendering process to an element, which the first information processing apparatus selects from a plurality of elements included in the first display data in accordance with the load information output at the communication step, and does not apply the rendering process to an element which the second information processing apparatus selects from a plurality of elements included in the second display data in accordance with the load information output at the communication step;

wherein the control step stops the rendering step from applying the rendering process to the first display data and controls the communication step to output the load information to both the first information processing apparatus and the second information processing apparatus if, at the communication step, the acquisition request is received from the second information processing apparatus during the rendering process of the first display data.

11. An information processing apparatus comprising:

an acquisition unit configured to acquire load information relating to a load state of a display apparatus, wherein the display apparatus generates a display screen by executing a rendering process of a display data and, the display data includes a plurality of elements relating to the rendering process;

a selection unit configured to select an element that causes the rendering process to stop, from the plurality of elements, in accordance with the load information acquired by the acquisition unit, wherein the selection unit selects a first predetermined element for a first state if the load state of the display apparatus is the first state, and selects a second predetermined element for a second state in which the load of the display apparatus is heavier than the first state if the load state of the display apparatus is the second state; and an output unit configured to output discrimination information for discriminating the element selected by the selection unit such that the display apparatus is not to execute the rendering process of the element selected by the selection unit, wherein if the load state of the display apparatus is the first state, the output unit outputs the discrimination information for discriminating the first predetermined element selected by the selection unit to the display apparatus in order to prevent the display apparatus from executing the rendering process of the first predetermined element, and wherein if the load state of the display apparatus is the second state, the output unit outputs the discrimination information for discriminating the second predetermined element selected by the selection unit to the display apparatus in order to prevent the display apparatus from executing the rendering process of the second predetermined element.

12. The apparatus according to claim 11, wherein the display data is described in a markup language, and wherein the discrimination information indicates a tag of the markup language corresponding to the selected element.

13. A method of controlling an information processing apparatus, the method comprising:

an acquisition step of acquiring load information relating to a load state of a display apparatus, wherein the display apparatus generates a display screen by executing a rendering process of a display data and, the display data includes a plurality of elements relating to the rendering process;

a selection step of selecting an element that causes the rendering process to stop from the plurality of elements in accordance with the load information acquired by the acquisition unit, wherein a first predetermined element is selected for a first state, if the load state of the display apparatus is the first state, and a second predetermined element is selected for a second state in which the load of the display apparatus is heavier than the first state, if the load state of the display apparatus is the second state;

an output step of outputting discrimination information for discriminating the element selected by the selection unit such that the display apparatus is not to execute the rendering process of the element selected at the selection step;

wherein if the load state of the display apparatus is the first state, the output step outputs the discrimination information for discriminating the first predetermined element selected by the selection step to the display apparatus in order to prevent the display apparatus from executing the rendering process of the first predetermined element, and wherein if the load state of the display apparatus is the second state, the output step outputs the discrimination information for discriminating the second predetermined element selected by the selection step to the display apparatus in order to prevent the display apparatus from executing the rendering process of the second predetermined element.

14. The method according to claim 13, wherein the display data is described in a markup language, and wherein the discrimination information indicates a tag of the markup language corresponding to the selected element.

* * * * *